J. RUTHVEN.
Carbureter and Regulator.
No. 214,711. Patented April 22, 1879.
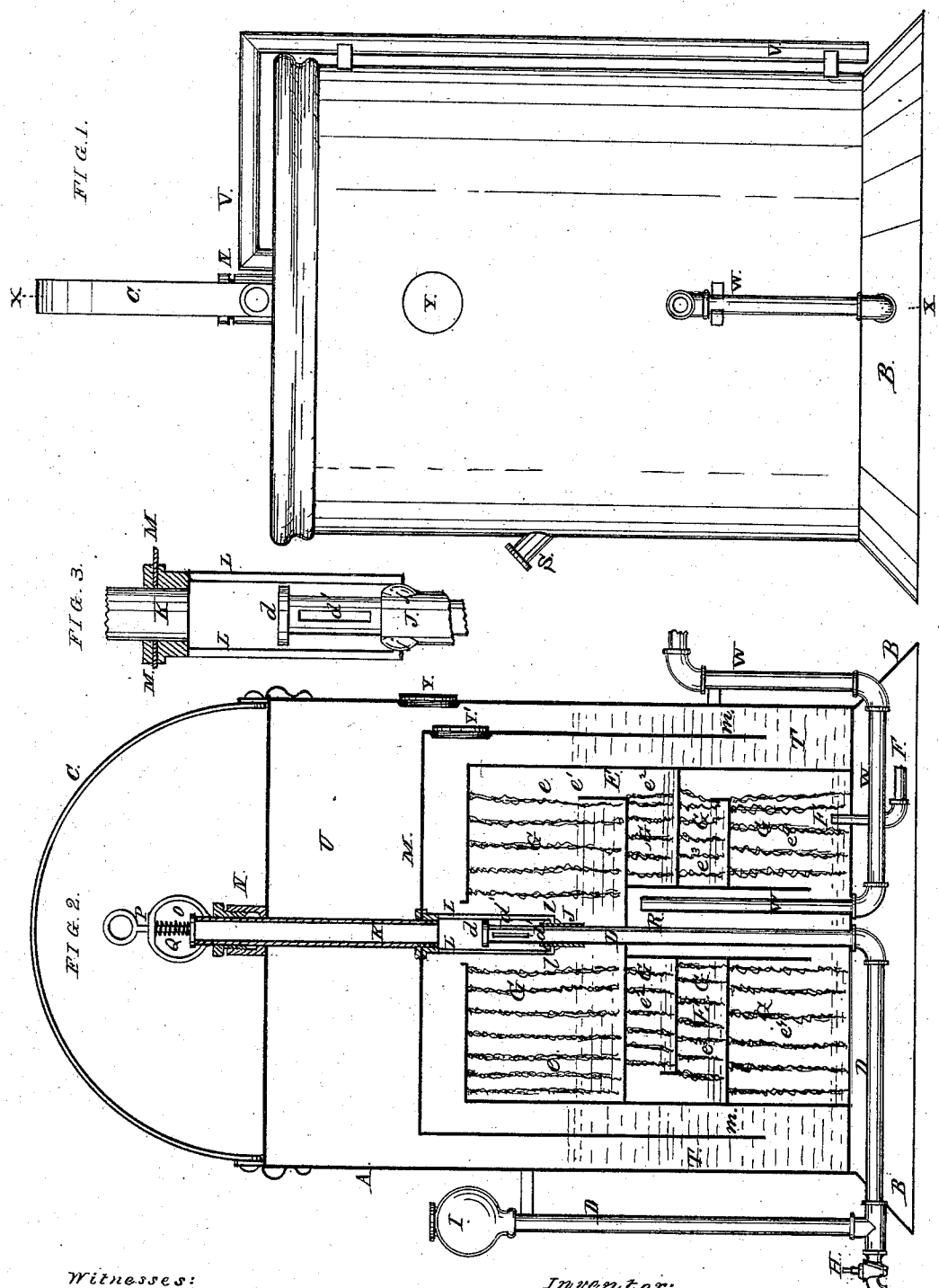

UNITED STATES PATENT OFFICE.

JOHN RUTHVEN, OF ST. LOUIS, MISSOURI.

IMPROVEMENT IN CARBURETERS AND REGULATORS.

Specification forming part of Letters Patent No. 214,711, dated April 22, 1879; application filed July 8, 1878.

*To all whom it may concern:*

Be it known that I, JOHN RUTHVEN, of the city of St. Louis, in the State of Missouri, have invented a certain new and useful Improvement in Carbureters and Regulators, of which the following is a full, clear, and exact description, reference being had to the accompanying drawings, forming part of this specification.

The first part of my improvement consists in inclosing the whole apparatus within a case air-tight at all points except the top, where a central orifice permits of communication with the external air through a pipe, which extends to the bottom of the case.

The invention relates, secondly, to the combination, with the carbureting-chamber and its inclosing gas-holder, of a perforated induction-pipe and a sleeve-valve, removably connected to the gas-holder by a pipe and spring-bail, as hereinafter fully described.

The third part of my improvement consists in the combination, with the carbureter, of the inlet and outlet pipes, the inlet-pipe extending from the outside of the case to the upper compartment of the carbureting-chamber, and the outlet or discharge pipe extending up into a central close-topped chamber in the carbureting-chamber, into which the gas enters from the bottom.

In the drawings, Figure 1 is a side view. Fig. 2 is a section at line $x\,x$. Fig. 3 is a detail side view of the governor-valve and detachable connection enlarged.

A is the case, made air-tight. B is the base. C is a bail, by which the apparatus may be carried. D is the pipe through which gas or air may enter the upper compartment, $e$, of the carbureting-chamber E.

I claim no special novelty in the carbureting-chamber as to its general construction.

The liquid hydrocarbon first enters a tray forming the bottom of the upper compartment, and overflows from one side of the tray or pan into the next compartment, $e^2$, at overflow $e^1$, and so on, to the lower compartments, $e^3$ and $e^4$. In the bottom of the lower compartment, $e^4$, is an overflow-pipe, F, that prevents the liquid from rising in said compartment above a certain height. All the compartments contain hanging wicking G, which draws up the liquid from the troughs by capillary attraction, and supplies it to the gas or air passing through the chamber E.

The pipe D is supplied with a cock, H, to close it when not in use. The pipe D has, at its upper end, outside the case, an oil-cup, I, with an air-tight cover, through which the hydrocarbon is supplied. The liquid runs through the pipe to its inner end, $d$, and out through vertical slots or orifices $d'$, beneath the closed end $d$. The end consists of a cap, $d$, of greater diameter than the pipe, so as to act as a stop to the sleeve-valve J, which is connected to the gas-holder M by means of the pipe K and spring-bail L. The ends of the bail are turned inward, and engage in eye-plates $j$ upon the sides of the sleeve-valve.

The pipe K passes with a tight joint through the center of the gas-holder top, and extends up through a stuffing-box, N, in the center of the top of case A. The top of the pipe is closed by a spring-valve, O, whose stem P is surrounded by a spring, Q, that forces the valve O down upon its seat, except when it is drawn up by the stem P. Beneath the upper compartment, $e$, of the carbureting-chamber is a close-topped central gas-chamber, R. The chamber is open at bottom for the passage of the pipes D and W. The upper end of the escape-pipe W opens near the top of the chamber R, and said pipe extends downward through the open bottom and to the outside of the case, where it extends upward and to the gas-burner.

S is a neck, by which liquid is supplied to the annular trough T, in which the edge $m$ of the gas-holder is immersed, and in which it works.

The chamber U above the gas-holder communicates with the outer air only through a pipe, V, which opens into the top of the chamber at about the middle, and which extends to the base of the machine, so that in case any gas might find its way into the chamber U it would have to traverse the whole length of the pipe and be discharged at the base. The pipe is made to communicate with the chamber only at the middle, so that in case the machine should be upset the water from the chamber T will not run out.

When used as a carbureter, gasoline or other hydrocarbonaceous liquid is filled into the pans through the pipe D. Then the surplus liquid is drawn from the cock H, and air may be supplied through the cup I; but, if the cock H, through which the pipe D is drained of liquid, be left open, air might enter through that also to the pipe D, whence it descends through the compartments and the overflow-openings of the chamber E, and through the chamber R and pipe W to the burners.

The gas-holder acts as a regulator, and partly or wholly closes the openings $d$ when the accumulation of gas raises it above a certain point, and checks or stops the influx of air, and as the gas is exhausted the holder descends and allows the air to enter in greater quantity. When used as an increaser, the operation is the same, except that gas, instead of air, enters through the pipe D. When used simply as a regulator or gas-governor, the operation is the same, except that no gasoline is required in the carbureting-chamber, but the gas simply passes through it.

The gas-holder may be disconnected from the governor-valve by springing outward the ends $l$ of the bail L, (allowing the sleeve-valve to drop, and leaving ports $d'$ open,) and then the holder may be used as a forcing device to force the air through the carbureter. In this case the stem P is drawn up, and carries with it the pipe K and gas-holder M, the valve O rising with the stem, and allowing the air to enter beneath the gas-holder through the pipe K. The valve, when relieved, closes by the force of spring Q, and the weight of the holder (and the parts attached to it) forces the air through the carbureting-chamber. In this form the machine is very useful as a fire-lighter, or for the use of jewelers or other persons requiring to use a blow-pipe, as the gas-holder may be loaded to cause any required pressure on the gas-jet.

The orifice in the top, connecting with pipe V, allows the air to escape from and enter the chamber U as the gas-holder rises and falls.

At Y is shown a screw-cap, closing an orifice in the case A for the introduction of an instrument to make or break the connection between the bail L and the valve J. The gas-holder has a similar orifice in its side for this purpose, closed by a similar cap, Y'.

To limit the amount of gas passing through the apertures $d'$, the gland of the stuffing-box N may be screwed upward, so as to prevent the descent of the sleeve-valve J below a defined point, as will be readily understood by examination of Fig. 2.

I claim as my invention—

1. In a carbureter, the tight case A, having a single central orifice communicating with the outer air through a descending pipe, V, for the purpose set forth.

2. In combination with the carbureting-chamber E and the inclosing gas-holder M, the induction-pipe D, having openings $d'$, and the sleeve-valve J, removably connected to the gas-holder by pipe K, and spring-bail L, substantially as and for the purpose set forth.

3. The combination of gas-holder M, detachable bail L, sleeve-valve J, and feed-pipe D, having ports $d'$, substantially as set forth.

JOHN RUTHVEN.

Witnesses:
  SAML. KNIGHT,
  C. W. A. BROWN.